United States Patent [19]

Norman

[11] 4,208,396
[45] Jun. 17, 1980

[54] OXYGEN RECOVERY FROM GAS MIXTURES

[75] Inventor: John H. Norman, La Jolla, Calif.

[73] Assignee: General Atomic Company, San Diego, Calif.

[21] Appl. No.: 865,950

[22] Filed: Dec. 30, 1977

Related U.S. Application Data

[63] Continuation-in-part of Ser. No. 786,009, Apr. 8, 1977, Pat. No. 4,089,940, which is a continuation-in-part of Ser. No. 601,917, Aug. 4, 1975, abandoned.

[51] Int. Cl.² .............................................. C01B 13/00
[52] U.S. Cl. .................................... 423/579; 423/219; 423/242; 423/481; 423/522
[58] Field of Search .................... 423/579, 219, 242 R, 423/244 R, 648 R, 481, 522, 528

[56] References Cited

U.S. PATENT DOCUMENTS

| | | | |
|---|---|---|---|
| 3,318,662 | 5/1967 | Pauling | 423/242 R |
| 4,056,607 | 1/1977 | Behr | 423/579 |
| 4,080,436 | 3/1978 | Fremery et al. | 423/579 |
| 4,089,939 | 5/1978 | Norman et al. | 423/648 R |
| 4,089,940 | 5/1978 | Norman et al. | 423/579 X |

*Primary Examiner*—Edward J. Meros
*Attorney, Agent, or Firm*—Fitch, Even & Tabin

[57] ABSTRACT

Substantially pure $O_2$ is recovered from a gaseous mixture containing $O_2$ and another gas, such as $SO_2$ or $NH_3$. An $O_2$–$SO_2$ mixture is injected into a substantially vertical reaction zone to which $I_2$ and $H_2O$ are continuously supplied at an upper location. By injecting the gas mixture at a lower location and at a preselected rate, substantially all of the $SO_2$ in the mixture either reacts chemically or is dissolved in the $H_2O$. $I_2$ may be supplied in particulate form and in substantial excess with respect to water so that the intermediate zone resembles a packed bed of wet iodine, in which case the gaseous mixture flows in the interstices of the packed bed. Electrolysis or an other chemical reaction wherein $O_2$ does not take part can also be used.

4 Claims, 1 Drawing Figure

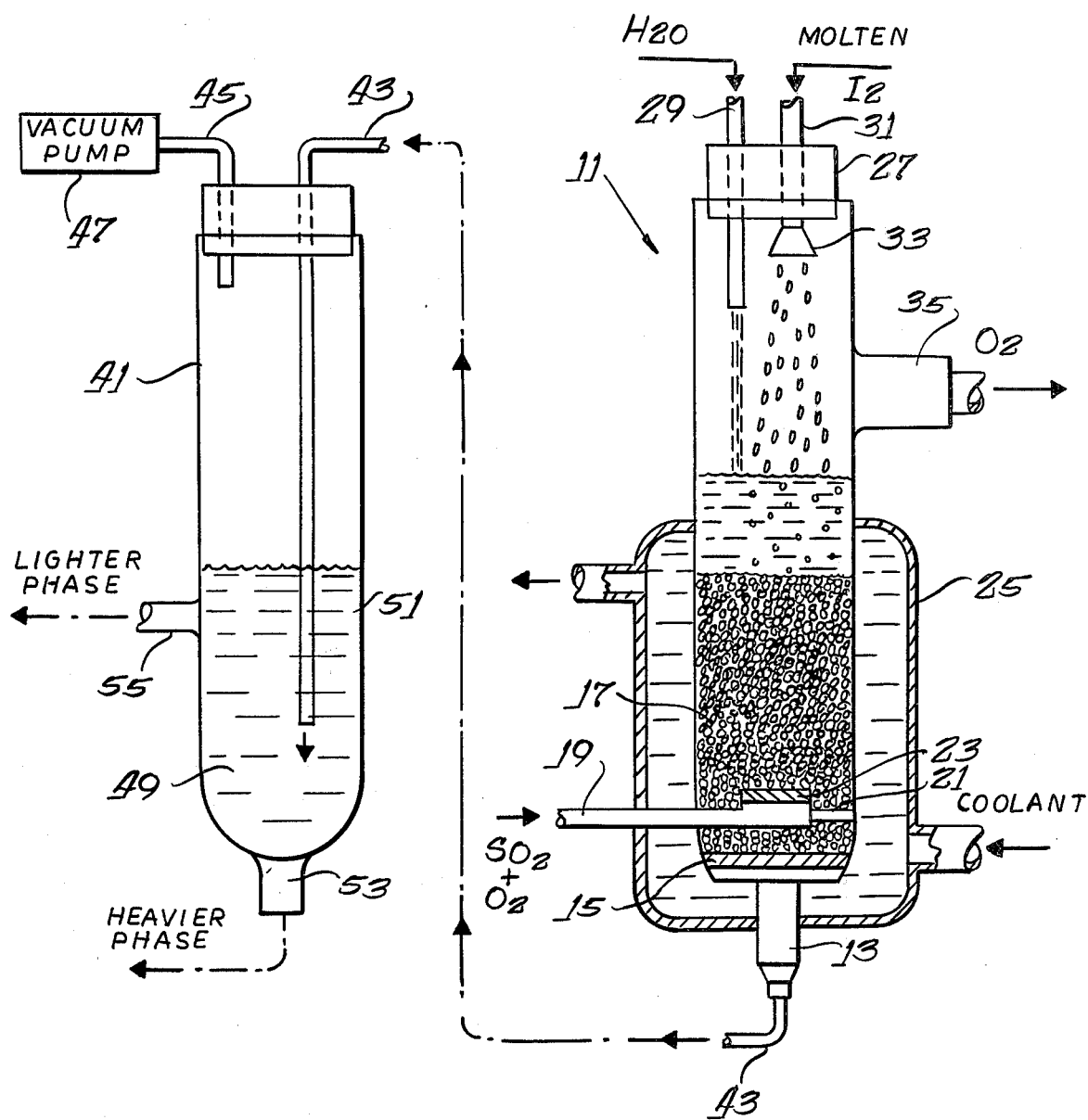

OXYGEN RECOVERY FROM GAS MIXTURES

This application is a continuation-in-part of application Ser. No. 786,009, filed Apr. 8, 1977, now U.S. Pat. No. 4,089,940, issued May 16, 1978, which was a continuation-in-part of application Ser. No. 601,917, filed Aug. 4, 1975, now abandoned.

This invention relates to a method of recovering oxygen from a gaseous mixture, and more particularly to a method for recovering oxygen from a mixture of oxygen and sulfur dioxide by chemically oxidizing the sulfur dioxide without reacting the oxygen.

Various methods have been developed for recovering oxygen from gaseous mixtures, for example, air. Generally, these processes condense the gaseous mixture and then separate the gases in a fractionating column utilizing their difference in boiling points. U.S. Pat. No. 3,888,750, issued June 10, 1975, is directed to the electrolytic decomposition of water to produce hydrogen and oxygen via a reaction with $SO_2$ wherein the $SO_2$ from the $O_2$—$SO_2$ mixture is recovered by sequentially compressing, cooling and separating. The present invention avoids the energy intensive needs for compression and for refrigerated liquefaction and thus has significant advantages in an economy where the cost of energy is high.

The invention provides a method of recovering oxygen from a mixture of oxygen and another gas by oxidizing the other gas, e.g., by causing it to undergo a chemical reaction, or by subjecting it to electrolysis, in a manner which produces nongaseous reaction products. As a result, the gas leaving the reaction zone is substantially pure oxygen, and the separation is effected without compressing and/or liquefaction. The invention is particularly useful wherein a closed cycle is being carried out. For example, in one method for the production of hydrogen and oxygen from water, the main reaction involving sulfur dioxide, water and preferably another nongaseous reactant can serve as the chemical reaction which effects the oxygen separation. Mixtures of oxygen and other gases, such as ammonia, can also be separated.

Various objects and advantages of the invention will be apparent from the following detailed description when read in conjunction with the appended drawing which diagrammatically depicts a presently preferred arrangement for separating oxygen from a gaseous mixture which embodies various features of the invention.

U.S. Patent application Ser. No. 786,009, filed Apr. 8, 1977 and assigned to the assignee of this application, now U.S. Pat. No. 4,089,940 describes in detail the use of the Bunsen reaction as a main step in a process for the thermochemical production of hydrogen. The equilibrium equation which defines the Bunsen reaction is as follows:

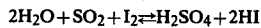

$$2H_2O + SO_2 + I_2 \rightleftharpoons H_2SO_4 + 2HI$$

It has been found that if the Bunsen reaction is carried out with a large excess of iodine, with respect to the reacting water, and with sulfur dioxide supplied preferably in a saturation amount, the reaction products separate into two layers of differing density which can be easily recovered independently of each other. The more dense or heavier phase contains a major fraction of the excess $SO_2$ and $I_2$ reactants, plus the major portion of the hydrogen iodide that is produced which is generally present in the form of polyiodides. The lighter phase contains nearly all of the $H_2SO_4$ and minor amounts of $I_2$, $SO_2$ and $H_2O$.

Normally, water serves not only as one of the reactants in the Bunsen reaction but also as at least a part of the medium wherein the reaction occurs, and both of the resultant phases contain water. In general, although dependent somewhat upon the temperature, up to about 10 percent of the water which is present is available to take part in the reaction, regardless of the amount of excess $SO_2$ and $I_2$, with the remainder of the water fulfilling its function as a solvent.

The reaction may be carried out at room temperature (i.e., about 21° C.) and at atmospheric pressure; however, reduced temperatures, e.g., down as low about −60° C., may be used. Temperatures as high as about 200° C. might also be employed; however, correspondingly higher pressures would be used to retain the water in the liquid form.

The FIGURE diagrammatically illustrates apparatus for carrying out a continuous process wherein a gaseous mixture of oxygen and sulfur dioxide are bubbled into a reaction zone and oxygen, substantially free of sulfur dioxide, is recovered from the region above the liquid level. A vertical reaction vessel 11 is used which is made of a suitable material that is resistant to hydriodic acid, e.g., a quartz or glass-lined vessel or one made of a suitably chemically-resistant metal alloy. An exit line 13 connects to the bottom of the reaction vessel 11, and a porous support 15 fused from extra coarse glass frit separates the exit from the remainder of the reaction vessel and provides a support or base upon which a packed bed 17 of solid iodine rests.

At a location just above porous support 15, an inlet tube 19 enters through the side of the reaction vessel 11 and terminates centrally within the vessel. An upward facing diffuser 23, fused from coarse glass frit, is provided at the end of the inlet tube 19 and is supported by a spider 21. Suitable gas pressure is maintained within the inlet tube 19 to prevent the entry of liquid thereinto. During the reaction, the gaseous mixture being supplied bubbles upward through the passageways provided in the diffuser 23.

Because the Bunsen reaction is exothermic, a coolant jacket 25 is preferably provided to remove the heat of the reaction and maintain the desired temperature in the intermediate zone above the diffuser 23 where the chemical reaction takes place. A top cap 27 to the reaction vessel contains a water supply inlet 29 and a line 31 through which iodine is supplied, both at the desired flow rates. If desired, the iodine may be pumped through the line 31 in molten form and through a spray head 33, in which case the droplets of iodine will crystallize when they enter the water and sink to the upper level of the packed bed 17. Alternatively, iodine can be supplied in particulate form. A side outlet 35 provides a gas exit, at a level vertically above the water level, through which the oxygen recovery is effected.

In carrying out the reaction, the particulate bed 17 of solid iodine is first built up in the reaction vessel, and then water is added to a predetermined level below the side outlet 35. A mixture of sulfur dioxide and oxygen in gaseous form, which may contain two or more times as many mols of sulfur dioxide as mols of oxygen (for reasons explained hereinafter), is supplied to the inlet tube 19 at the desired pressure, and as the bubbles leaving the diffuser begin to travel upward through the packed bed 17 of iodine crystals, the reaction begins.

The reaction products which are formed, namely sulfuric acid and hydrogen iodide, mostly in the polyiodide form, are heavier than the water and gravitate to the bottom of the reaction vessel 11. The reaction products are withdrawn through the extra coarse porous support 15, preferably by the use of vacuum. As the particulate bed 17 of iodine decreases in size due to the chemical reaction, replacement iodine is added through the supply line 31. Water is also added at a rate proportional to the rate at which the reaction products are withdrawn so as to maintain about the same water level within the reaction vessel 11.

The uppermost layer in the reaction vessel 11 is water containing some dissolved iodine. As steady-state conditions are approached, there is a lower zone generally adjacent the diffuser 23 where the reaction is substantially complete and through which the gaseous mixture simply bubbles because the liquid is already saturated in $SO_2$. Above this zone, there is an intermediate zone where the reaction is taking place and wherein the $SO_2$ content of the bubbles is being substantially depleted.

Above this intermediate reaction zone, there is an unreactive zone where substantially all of any remaining sulfur dioxide in the bubbles is absorbed by the incoming water so that the upper region at the top of the reaction vessel 11 becomes filled with substantially pure oxygen, which is withdrawn at an appropriate rate through the side outlet 35 and recovered. The rate of supply of the gaseous mixture to the diffuser 23 is carefully regulated so that any of the sulfur dioxide which does not react in the intermediate zone is dissolved in the upper water layer and of course subsequently reacts when it reaches the intermediate zone.

An important point with respect to accomplishing the desired $SO_2$—$O_2$ separation is that the overall system is such that $O_2$ is kinetically hindered from reacting with either a reactant or with a product of the system. For example, $O_2$ has the potential to react with both $SO_2$ ($SO_2 + \frac{1}{2} O_2 + H_2O \rightarrow H_2SO_4$) and with $HI(2HI_x + \frac{1}{2} O_2 \rightarrow H_2O + xI_2)$. Thus, although the possibility of either, or both, of these reactions occurring would appear to render such a separation thermodynamically infeasible, the kinetics are so slow that this type of separation is practical because $O_2$ bubbles upward without any substantial reaction taking place.

As earlier indicated, the reaction is carried out under conditions which produce a resultant two-phase system, and the ultimate phase separation is depicted in a separatory vessel 41 into which the reaction products are withdrawn. Tubing 43 connected to the bottom outlet 13 connects to the top of the separatory vessel 41 and extends downward to a lower location therein. The rate of withdrawal is regulated by varying the amount of vacuum applied to the separatory vessel through a vacuum line 45 connected to a vacuum pump 47, or alternatively by placing an adjustable valve (not shown) in the withdrawal line 43.

In the separatory vessel 41, the reaction products form a heavier phase 49 containing most of the polyiodides and a lighter phase 51 containing most of the sulfuric acid. Separation of these two liquid phases is carried out by withdrawing them at appropriate rates through separate withdrawal conduits 53,55 provided respectively at the bottom and at a higher level in the separatory vessel 41. The heavier phase is degassed to remove unreacted sulfur dioxide and then subsequently treated to separate the hydrogen iodide. The details of this treatment form no part of the present invention, and reference may be had to the above-identified copending application for a discussion on the treatment of the heavier phase. Eventually, the hydrogen iodide is decomposed using known technology, e.g., photolytically or pyrolytically, to recover hydrogen (which is the intended product) and iodine. The iodine is recycled to the main reaction.

The lighter phase is preferably heated in a stripping column to first drive off most of the sulfur dioxide, water and iodine, for example, by operating at a temperature of about 200° C., at atmospheric pressure. These vapors are condensed and recovered for reuse. The resulting mixture of sulfuric acid and water is then supplied to a still to separate the remaining water by distillation. Thereafter, the sulfuric acid is vaporized by heating to a temperature of at least about 335° C. (its boiling point at 1 atm.).

The sulfuric acid vapors are then transformed into water and sulfur trioxide, which in turn breaks down at high temperatures, accelerated by the presence of a catalyst, to sulfur dioxide and oxygen. Previously mentioned U.S. Pat. No. 3,888,750 illustrates and describes in detail the thermochemical decomposition of sulfuric acid with the resultant production of oxygen, sulfur dioxide and water. Stoichiometrically, 2 mols of sulfur dioxide will be produced for each mol of oxygen.

This gaseous mixture of $O_2$ and $SO_2$ is returned to the main reaction vessel 11 via the inlet line 19. If the overall cycle for the production of hydrogen and oxygen from water is being carried out on a continuous basis, the mixture of sulfur dioxide and oxygen which is obtained from the thermal decomposition of sulfuric acid will not be sufficient to provide the needed sulfur dioxide. Accordingly, the sulfur dioxide which is obtained from the strippers that initially treat the separate heavier and lighter phases will be added to this mixture to make it even richer in sulfur dioxide, and additional makeup $SO_2$ will be added if necessary. In any event, the amount of sulfur dioxide in the mixture will be regulated so that it substantially entirely reacts in the intermediate zone of the reaction vessel 11 or is dissolved in the water thereabove so that the oxygen (as an essentially pure byproduct of the overall water-splitting process) is removed from the side outlet 35.

As an example of this step of such an overall process with which the invention is concerned, a mixture containing about 25 volume percent oxygen and 75 volume percent sulfur dioxide is bubbled into a vertical reaction vessel through a diffuser. The reaction vessel contains a packed bed of crystalline iodine submerged in water. As the gaseous mixture bubbles thereinto, the Bunsen reaction begins, and the size of the bubbles decreases markedly as they travel upward through the intermediate zone. The temperature of the reaction vessel rises, and coolant is circulated through the jacket to maintain a temperature of about 90° C. Water and iodine are added as necessary to maintain the desired levels within the reaction vessel, and after steady-state operation has been achieved, the gas which exits from the side exit is tested and found to constitute greater than 99.5 v/o oxygen on a dry basis.

Although the invention has been described with regard to certain preferred embodiments, it should be understood that changes and modifications as would be obvious to one having the ordinary skill in this art may be made without departing from the scope of this invention which is defined solely by the claims appended hereto. For example, although the discussion has been directed to the oxidation of sulfur dioxide that occurs when a mixture of oxygen and sulfur dioxide is injected into a zone containing $I_2$ and $H_2O$, sulfur dioxide can be oxidized in other liquid systems wherein oxygen does not react. For example, $SO_2$ can be reacted with $H_2O$, $NH_3$ and $I_2$ or with HCHO and water. A mixture of $SO_2$ and $O_2$ can be subjected to electrolysis to produce an aqueous solution of $H_2SO_4$ as described in U.S. Pat. No. 3,888,750 to obtain purified oxygen and hydrogen at the other electrode. Moreover, a mixture of oxygen and some other reactive gas, for example, $NH_3$, may be separated by causing a reaction between $NH_3$ and, for example, acetic acid wherein oxygen does not take part because of kinetic reasons and simply bubbles through the aqueous acetic acid system.

Various of the features of the invention are set forth in the claims which follow.

What is claimed is:

1. A method of recovering $O_2$ from a gaseous mixture containing $SO_2$ and $O_2$, which method comprises
   injecting said mixture into a lower location of a reaction zone containing a liquid $H_2O$ medium and $I_2$ at a controlled rate so that substantially all of said $SO_2$ is removed from said mixture, said $SO_2$ reacting chemically with the $I_2$ and the $H_2O$,
   removing sulfuric acid and hydrogen iodide reaction products from said zone and
   recovering $O_2$ substantially free from $SO_2$ from region above said zone.

2. A method in accordance with claim 1 wherein said $I_2$ and $H_2O$ are continuously supplied to an upper location in a substantially vertical reaction zone.

3. A method in accordance with claim 2 wherein an upper zone consisting mainly of water is located above said reaction zone and wherein said $O_2$ bubbles through said upper zone while remaining $SO_2$ dissolves prior to its reacting.

4. A method in accordance with claim 1 wherein a mixture of $SO_2$ and $O_2$ is obtained from the thermal decomposition of said sulfuric acid reaction products and recycled to the reaction zone.

* * * * *